US012698797B2

(12) United States Patent
Hutchinson

(10) Patent No.: US 12,698,797 B2
(45) Date of Patent: Aug. 4, 2026

(54) UNIVERSAL VECTOR BUSHING SYSTEM

(71) Applicant: Lockheed Martin Corporation,
Bethesda, MD (US)

(72) Inventor: Andrew Logan Hutchinson, Palmdale,
CA (US)

(73) Assignee: Lockheed Martin Corporation,
Bethesda, MD (US)

( * ) Notice: Subject to any disclaimer, the term of this
patent is extended or adjusted under 35
U.S.C. 154(b) by 526 days.

(21) Appl. No.: 18/240,468

(22) Filed: Aug. 31, 2023

(65) Prior Publication Data

US 2025/0075732 A1     Mar. 6, 2025

(51) Int. Cl.
*F16C 17/02* (2006.01)
*F16C 11/04* (2006.01)
(52) U.S. Cl.
CPC .............. *F16C 17/02* (2013.01); *F16C 11/04*
(2013.01)
(58) Field of Classification Search
CPC ................................. F16C 17/02; F16C 11/04
USPC ............................................ 408/72 B, 115 B
See application file for complete search history.

(56) References Cited

U.S. PATENT DOCUMENTS

| 1,923,847 | A | 8/1933 | Seelert |
| 3,157,068 | A | 11/1964 | Rickert |

| 4,365,917 | A | 12/1982 | Harmand | |
| 7,220,085 | B2 | 5/2007 | Nader | |
| 7,771,144 | B1 | 8/2010 | Nader | |
| 8,413,307 | B2 | 4/2013 | Katzenberger | |
| 8,987,612 | B2 * | 3/2015 | Callahan | ............... F16B 5/0258 |
| | | | | 174/653 |
| 9,108,250 | B1 * | 8/2015 | Bui | .......................... B23B 47/28 |
| 9,302,356 | B2 | 4/2016 | Katzenberger | |
| 12,344,402 | B1 * | 7/2025 | Hill, IV | .................. B23P 19/12 |
| 2024/0416432 | A1 * | 12/2024 | Batt | ......................... B23B 49/02 |

* cited by examiner

*Primary Examiner* — Christopher P Schwartz
(74) *Attorney, Agent, or Firm* — Baker Botts L.L.P.

(57) ABSTRACT

Embodiments provide a universal bushing system that
includes a base plate, vertical plates, and universal vector
bushing apparatuses. The vertical plates are mounted to base
plate and are separated by predetermined distance on base
plate to position a workpiece. The bushing apparatuses are
coupled to vertical plates. Each apparatus includes first
knob, second knob, bushing element, and pivoting portion.
The first knob includes threaded structures. The second knob
is coupled to first knob via the threaded structures. The
bushing element includes a recess with threaded tracks to
allow the second knob to be placed. The pivoting portion
includes a first end coupled to bushing element and a second
end to pivotally connect to a vertical plate. Each of the first
knob, the second knob, the bushing element, and the pivot-
ing portion forms a hollow portion concentric at longitudinal
axis that forms a slotted path to receive a threaded shaft.

20 Claims, 9 Drawing Sheets

UNACCEPTABLE

ACCEPTABLE CONDITIONS

600 —

700 —

UNIVERSAL VECTOR BUSHING SYSTEM

TECHNICAL FIELD

This disclosure generally relates to bushings and more specifically to a universal vector bushing system, vector bushing apparatus, a method of using the vector busing system and a method of assembling vector busing apparatus.

BACKGROUND

When manufacturing, maintaining, and modifying in the aerospace industry, it is common to come across an existing hole that needs to be "worked" (drilled, reamed, transferred, plugged, etc.) in a workpiece. Currently, some utilize drill bars and balls with screw clamps. However, the drill bars and the balls with screw clamps that currently exist are restricted in size and use.

SUMMARY OF PARTICULAR EMBODIMENTS

According to some embodiments, a universal vector bushing may be disclosed that enables free-range articulation and the ability to slide any kind of workpiece for locking. Embodiments allow a user to easily pick up the workpiece, for example, a vector or tool of a previous bore, lock the workpiece into the proper place, and then perform require work, for example, deburring.

According to some embodiments, a universal bushing system is disclosed. The universal bushing system includes a base plate, a plurality of vertical plates, and one or more universal vector bushing apparatuses. The plurality of vertical plates are mounted to the base plate and are separated by a predetermined distance on the base plate to position a workpiece. The one or more universal bushing apparatuses are coupled to the plurality of vertical plates.

According to some embodiments, each universal bushing apparatus includes a first knob, a second knob, a bushing element, and a pivoting portion. The first knob includes a plurality of threaded structures. The second knob is coupled to the first knob via the threaded structures. The bushing element includes a recess with threaded tracks to allow the second knob to be placed. The pivoting portion includes a first end coupled to the bushing element and a second end to pivotally connect to a vertical plate of the plurality of vertical plates. Each of the first knob, the second knob, the bushing element, and the pivoting portion forms a hollow portion concentric at a longitudinal axis that forms a slotted path to receive a threaded shaft.

According to some embodiments, a method of using a universal bushing system is disclosed. The method includes configuring each of two vertical plates to pivotally couple to one or more universal vector bushing apparatuses. The method further includes securing the base plate to a table. The workpiece may be positioned between the two vertical plates and wherein the workpiece includes a plurality of workpiece holes into which the threaded shaft may be inserted for locking the workpiece. In particular, the threaded shaft may be slid into the slotted path to slide through each of the plurality of workpiece holes, and then the workpiece may be secured by tightening the second knob while the first knob may be kept sturdy.

According to some embodiments, a method of assembling a universal bushing apparatus is disclosed. The method includes joining a first knob and a second knob. In an embodiment, the second knob is joined to the first knob via a plurality of threaded structures of the first knob. The method includes placing the second knob in a recess of a bushing element. In an embodiment, the recess of the bushing element comprises threaded tracks to allow the second knob to be placed. The method includes rotating the second knob into the threaded tracks of the recess of the bushing element while the first knob remains sturdy. The method includes attaching an end of the bushing element opposite to the recess of the bushing element to a pivoting portion. In an embodiment, each of the first knob, the second knob, the bushing element, and the pivoting portion are positioned in an alignment to form a slotted path along a longitudinal axis to receive a threaded shaft.

Technical advantages of certain embodiments may include providing free-range articulation and the ability to slide any kind of workpiece and lock the workpiece for performing deburring. Another technical advantage includes creating a series of radii (male) and counter radii (female) to allow over 120 degrees of free movement. Also, the main radii move along a slotted path allowing for clamping and easy vector pick-up. The universal bushing system or assembly allows the user to easily pick up the vector of a previous bore, lock the tool into place, and then perform the required work, for example, deburring for example. Embodiment relates to providing a wider range of movement to perform the work, for example, deburring. Existing technical methods and systems do not secure the workpiece in a proper manner which may result in deburred holes with raised material in the hole that may not be acceptable for configuring the workpiece. Particularly, the raised material may be related to uneven patterns. With the present embodiments, the workpiece may be properly secured into the bushing system through the bushing apparatus, and via the hollow portion, holes or openings may be created with a smooth finish without raised material. Additionally, embodiments disclosing universal bushing systems and universal bushing apparatuses are easier to use and set up to enable any kind of workpiece to be tightly secured and perform the deburring process. The bushing apparatus may be configured to accept any kind of shaft for deburring and still may result in creating holes and opening with smooth finishing.

Other technical advantages will be readily apparent to one skilled in the art from the following figures, descriptions, and claims. Moreover, while specific advantages have been enumerated above, various embodiments may include all, some, or none of the enumerated advantages.

DESCRIPTION OF EXAMPLE EMBODIMENTS

When manufacturing, maintaining, and modifying in the aerospace industry, it is common to come across existing holes that need to be "worked" (drilled, reamed, transferred, plugged, etc.) To solve the existing challenges, a universal vector bushing related to a universal bushing system and universal bushing apparatuses may be disclosed. One of the purposes of the universal vector bushing provides a new approach to "picking up" or establishing existing hole locations and angles (vectors). The universal vector bushing allows for free-range articulation and the ability to slide. This allows the user to easily "pick up" the vector of a previous bore, lock the tool into place, and then perform the required work.

To address these and other problems, the teachings of the disclosure provide creation of a series of radii (male) and counter radii (female) that allow over 120 degrees of free movement. Also, in one of the embodiments, main radii may move along a slotted path allowing for clamping and easy vector pick-up.

To facilitate a better understanding of the present disclosure, the following examples of certain embodiments are given. In no way should the following examples be read to limit, or define, the scope of the disclosure. Embodiments of the present disclosure and its advantages may be best understood by referring to the included FIGURES, where like numbers are used to indicate like and corresponding parts.

Figure 1A:
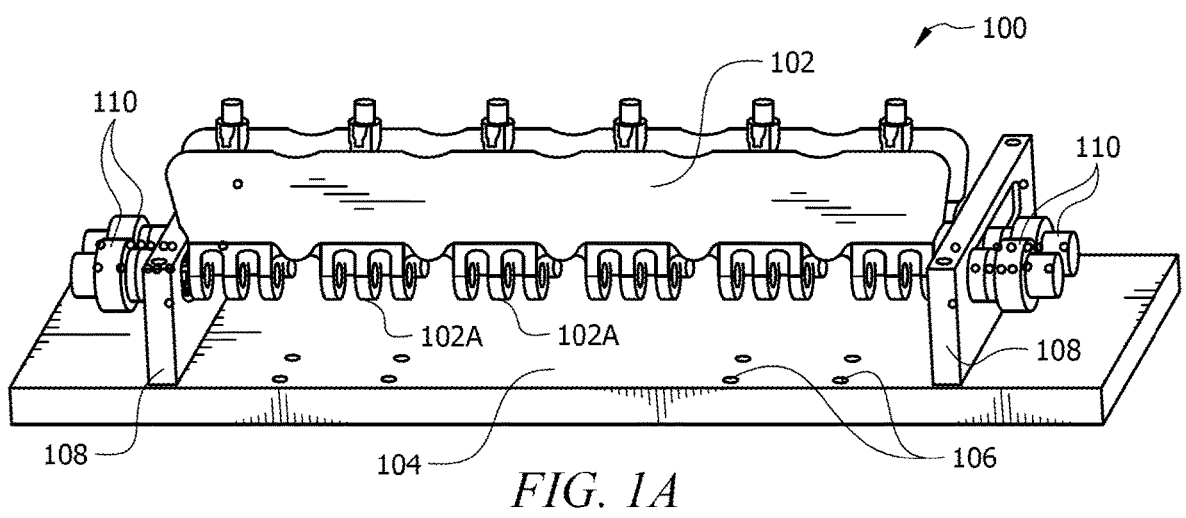
FIGS. 1a-1b illustrate a universal bushing system, according to certain embodiments.

FIG. 1a illustrates a universal vector bushing system 100. More particularly, FIG. 1a illustrates a universal vector bushing system 100 to hold a workpiece 102 steady while performing deburr operations. For example, FIGS. 1a-1b, show a tie bar as the workpiece 102.

The universal vector bushing system 100 includes a base plate 104, a plurality of vertical plates 108, and one or more universal vector bushing apparatuses 110. For example, FIG. 1a and FIG. 1b show two vertical plates 108 and four universal vector bushing apparatuses 110. In some embodiments, single vertical plate 108 and universal vector bushing apparatus 110 may be utilized.

In certain embodiments, the base plate 104 may be made of any metal, for example, aluminum, steel, or any other lightweight metallic component that enables easy pickup and arranging of the assembly of the universal vector bushing system 100 with bushing apparatuses to the workpiece 102. In some embodiments, the base plate 104 may be square, rectangular, circular, or any other appropriate shape to couple any kind of workpiece sturdily for deburring. In an embodiment, the base plate 104 may be configured with a plurality of slots 106 that may be formed at predetermined locations as shown in FIG. 1a and FIG. 1b. In exemplary embodiments, a pair of slots 106 of the plurality of slots may be parallel to another pair of slots 106 in the base plate 104. In some embodiments, each slot may be of any shape, for example, circular, rectangular, square, oval, and other shapes to couple dimensions of plate fasteners of vertical plates 108.

Figure 1B:
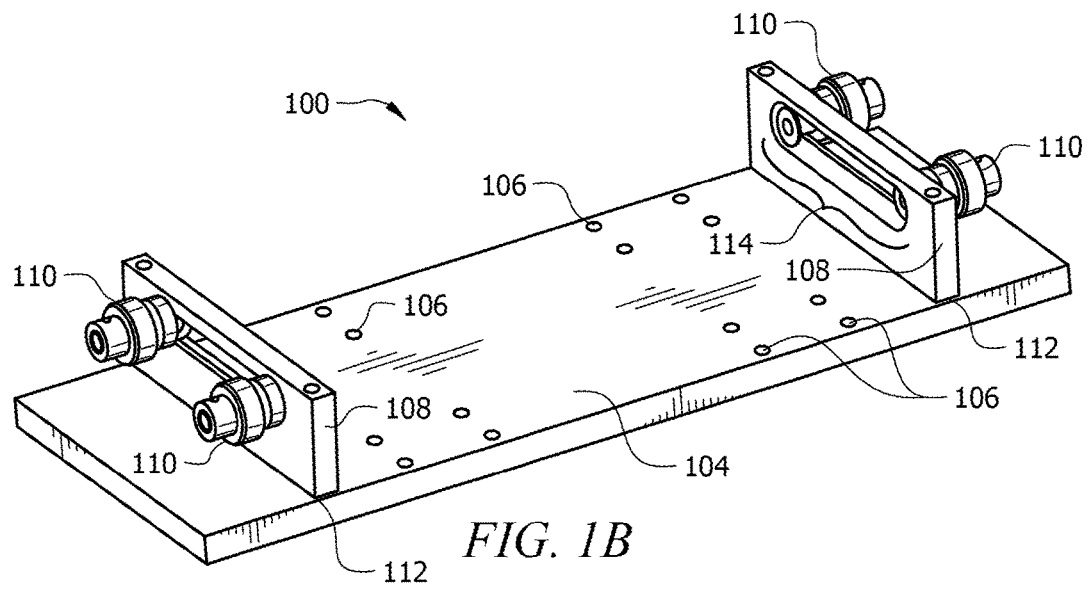

In certain embodiments, the universal vector bushing system 100 includes the vertical plates 108 as shown in FIG. 1a and FIG. 1b. The vertical plates 108 may be made of, for example, aluminum, steel, or any other lightweight component. The vertical plates 108 may be rectangular-shaped, square-shaped, or any other appropriate shape. Each vertical plate of the vertical plates 108 may include one or more plate fasteners to couple into one or more slots 106 of the base plate 104. In some embodiments, each vertical plate 108 may be fixed on the base plate 104 by fitting a plurality of plate fasteners into the one or more slots 106 of the base plate 104. In an embodiment, each slot 106 may be configured to receive a plate fastener 112 of the vertical plate 108. In exemplary embodiments, the plate fasteners 112 may be fit into the one or more slots 106 through any slide-in movement, snap-in movement, coupling via threads, screw-fit manner, and the like that may enable each vertical plate 108 to be fixed sturdily and securely on the base plate 104 with no further possibility of moving the vertical plate once fixed. As shown in FIG. 1a and FIG. 1b, one vertical plate 108 may be fixed at one predetermined location vertically along the base plate 104 and another vertical plate 108 may be parallelly fixed at another predetermined location of the base plate 104. In some embodiments, the vertical plates 108 may be coupled unparallel to one another depending on the kind of workpiece 102 that needs to be coupled between the vertical plates 108. In some embodiments, only one vertical plate 108 may be used to couple the workpiece 102. In particular embodiments, the one or more slots 106 of the base plate 104 allows the plurality of vertical plates 108 to be adjustably coupled according to the length and width dimensions of the workpiece 102. In certain embodiments, each vertical plate 108 may include an opening 114 to couple the one or more universal vector bushing apparatuses 110.

FIG. 1b shows an isometric view of the universal bushing system 100 with the one or more universal vector bushing apparatuses 110 being coupled to the vertical plates 108 via the opening 114. The opening 114 may be any shape to couple the one or more universal vector bushing apparatuses 110 intact. In an embodiment, the opening 114 of the vertical plate 108 may be coupled to one universal vector busing apparatus. For example, FIG. 1b shows a rectangle-shaped opening 114 to couple the parts, for example, a first end 210, pivoting portion 208, vector plates 211 and second end 212 (of FIG. 2) of the universal vector bushing apparatus 110 (200). In an embodiment, the rectangle-shaped opening 114 includes curvatures to couple in a manner for matching the shape of the universal vector bushing apparatuses 110, for example, to match the shapes of the parts 210, 208, 211 and 212 (of FIG. 2).

Figure 2:
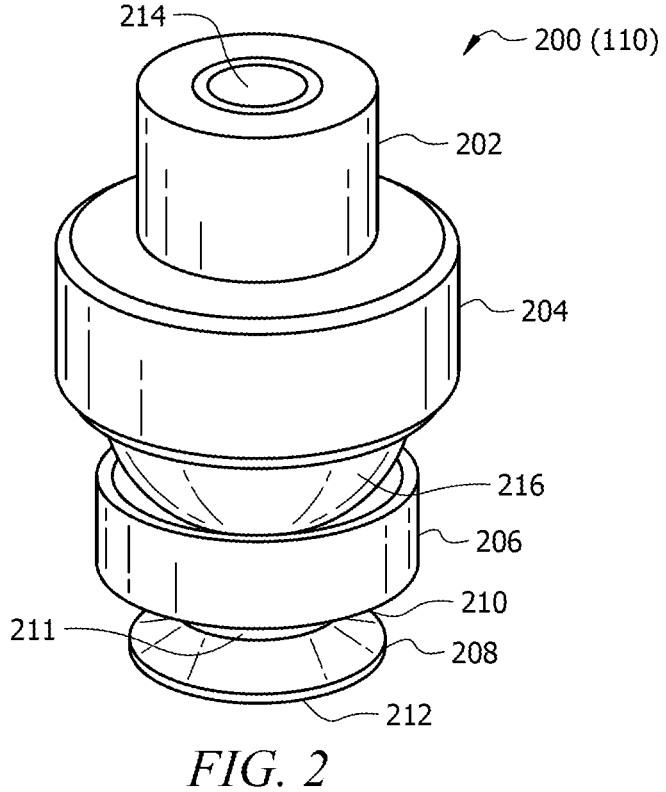
FIG. 2 illustrates a universal bushing apparatus, according to certain embodiments.

FIG. 2 illustrates a universal bushing apparatus 200 which may be one of the one or more universal bushing apparatuses 110 of FIG. 1a and FIG. 1b, according to certain embodiments.

In embodiments, certain the universal bushing apparatus 200 may be any metal, for example, steel, aluminum, and the like. In some embodiments, the universal vector bushing apparatus 200 may be referred to as a hole vector assembly including numerous parts as shown in an isometric view of FIG. 2.

The universal vector bushing apparatus 200 includes various sub-components and each sub-component may be made of similar or different material. In an embodiment, each sub-component may be aligned with one another as shown in the isometric view of FIG. 2.

The universal vector bushing apparatus 200 includes a first knob 202 which may comprise a plurality of threaded structures and set screws. For example, the set screws may be made of alloy steel and/or case hardened that may be configured to secure the first knob 202 and the pivoting portion 208 together. In some embodiments, the set screws may be screws not utilizing nuts and bolts. The set screws act like a clamp used to secure first knob 202 and the pivoting portion 208 together, by pressure and/or friction. For example, set screws in the first knob 202 may apply pressure to lock pivoting portion 208 while tightening the second knob 204. For example, one or more of the set screws joins the first knob 202 and the pivoting portion 208 together and locks them. In some embodiments, the first knob 202 may include one or more knurled surfaces that provide grip to the pivoting portion 208 and other portions of the apparatus 200. In an embodiment, the first knob 202 may provide a larger surface area to hold the pivoting portion 208 while tightening a second knob 204.

The universal vector bushing apparatus 200 may include the second knob 204 that may be coupled to the first knob 202 via the threaded structure of the first knob 202. In some embodiments, the second knob 204 may include one or more knurled surfaces. In an embodiment, the second knob 204 may be configured with threads to match pivoting portion 208. The second knob 204 may form the slotted path to receive the threaded shaft. In some embodiments, the second knob 204 may include a bowl portion 216 that may be configured with threads to couple to a recess portion of a bushing element 206 of apparatus 200. In an embodiment, the first knob 202, the second knob 204, a hollow portion 214 and the bowl portion 216 may rotate about bushing element 206 as an assembly to create a clamping surface for the threaded shaft 404 coupling to the workpiece 102.

The universal vector bushing apparatus 200 includes the bushing element 206 which includes the recess with threaded tracks to allow the second knob 204 to be placed. The recess of the bushing element 206 forms a seating portion for placing the bowl portion 216 of the second knob 204. In an embodiment, the bushing element 206 may be a concave surface to couple the convex surface of the bowl portion 216. In an embodiment, the bushing element 206 may rotate about the bowl portion 216. In an embodiment, the bushing element 206 and the bowl portion 216 may allow the nature of vector bushing apparatus 110/200 to keep the system 110/200 rigid and allowing vector apparatus 110 (200) alignment.

In certain embodiments, the universal vector bushing apparatus 200 includes a pivoting portion 208 having a first end 210 coupled to the bushing element 206 and a second end 212 to pivotally connect to the vertical plate 108 via the opening 114. In an embodiment, the first end 210, the pivoting portion 208, vector plates 211 and second end 212 of the universal vector bushing apparatus 110 (200) into the vertical plate 108 via the opening 114. FIG. 1b shows the coupling of the first end 210, the pivoting portion 208, vector plates 211 and second end 212 into the vertical plate 108 via the opening 114. This enables the universal vector bushing apparatus 200 (110 from FIG. 1a and FIG. 1b) to securely lock the workpiece 102 into place and perform the required work of deburring. In an embodiment, the pivoting portion 208 may include a convex surface with non-threaded surface to prevent rotation of the first knob 202, the bushing element 206 and the threaded shaft 404 once slid into the bushing apparatus 200. In an embodiment, the pivoting portion 208 may be held tightly via the set screws when the first knob 202, providing the larger surface, may be kept sturdy while tightening the second knob 204.

In an embodiment, the universal vector bushing apparatus 200 includes vector plates 211 between the bushing element 206 and the pivoting portion 208. In an embodiment, the pivoting portion 208 may be a convex surface with the first end 210 to reside in a concave surface of vector plates 211 to create the ability to swivel as the second knob 204 may be tightened. In the tightening process, the pivoting portion 208 may collapse into the vector plates 211 and creates a tightening surface for the threaded shaft.

In an embodiment, each of the first knob 202, the second knob 204, the bushing element 206, and the pivoting portion 208 may be aligned in an axis, forming a hollow portion 214. In an embodiment, the bushing element 206 and the bowl portion 216 may allow the vector apparatus 200 alignment to form the hollow portion 214. Particularly, a slotted path may be formed at a longitudinal axis along the hollow portion 214 to receive the threaded shaft. In an embodiment, the threaded shaft may be made of steel, such as 4140 and wear resistant D2 tool steel. In some embodiments, the hollow portion 214 along the longitudinal axis may be spherical shape and/or circular shape to match the shape of the threaded shaft. The threaded shaft is slid into one or more holes 102a of the workpiece 102. After sliding the threaded shaft 404 into the hollow portion 214 along the slotted path and into the one or more holes 102a of the workpiece 102, the workpiece 102 may be secured further by tightening the second knob 204 while the first knob 202 may be held or maintained study. In an embodiment, the pivoting portion 208 may also be held sturdy while the first knob 202 may be kept sturdy via the set screws to prevent rotation of the rest of pieces (206, 210, 208, 212 and 404) and thus providing clamping mechanism for the vector apparatus 200 and the workpiece 102. In this manner, the workpiece 102 may be securely placed in the universal vector bushing system 100 and may be worked on for deburring process. In some embodiments, one or more sleeves may be used to assemble a small hole workpiece 102 (small hole tie bar). For example, the one or more sleeves may be used for better fitment when the threaded shaft (PIN) may be loose in the workpiece 102 (tie bar).

Figure 3A:
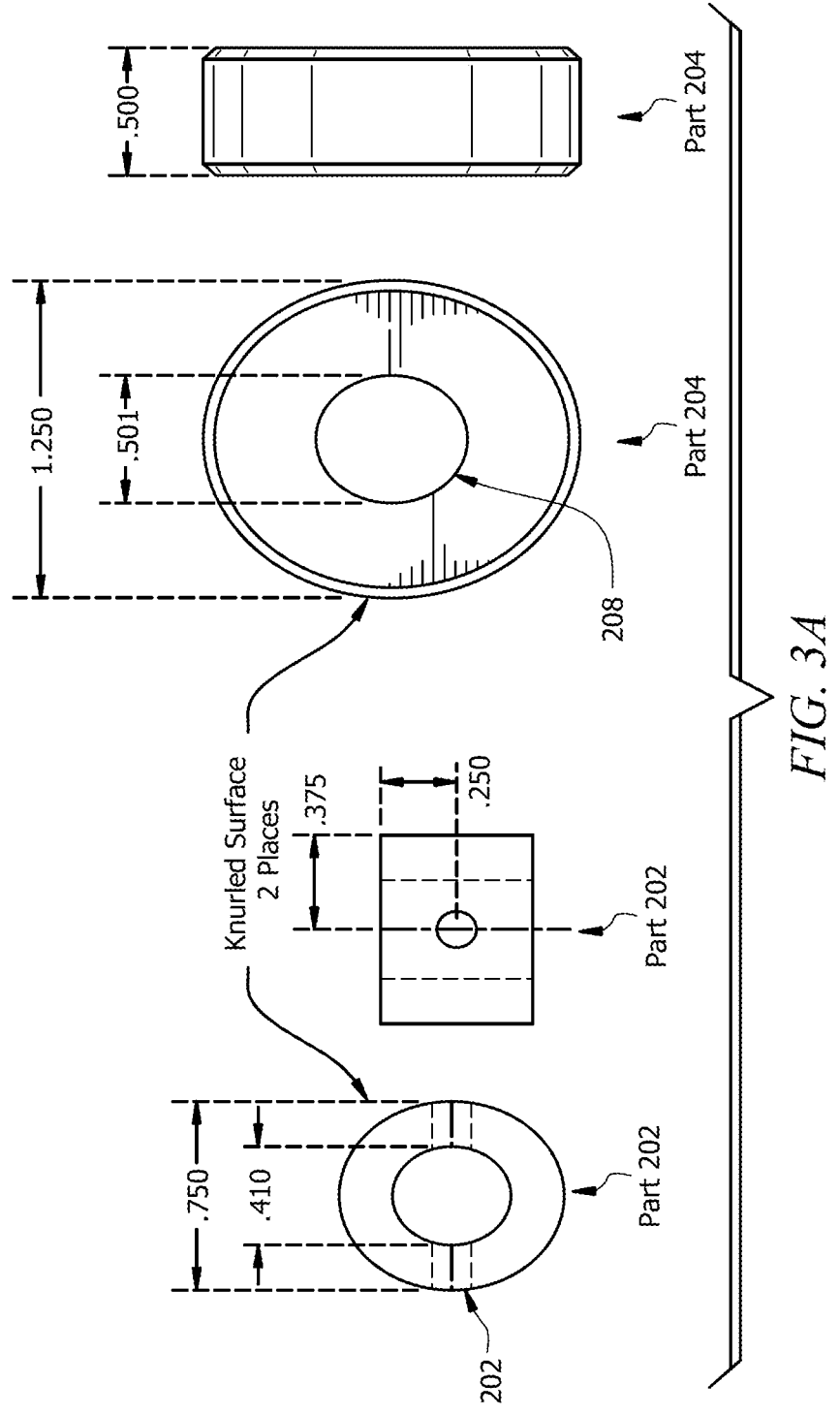
FIGS. 3a-3d illustrate views of different parts of the universal bushing apparatus, according to certain embodiments.

FIG. 3a shows the universal vector bushing apparatus 200 having the first knob 202 with the plurality of threaded structures and set screws 302. Each of the first knob 202 and the second knob 204 includes the one or more knurled surfaces as shown in FIG. 3a.

Figure 3B:
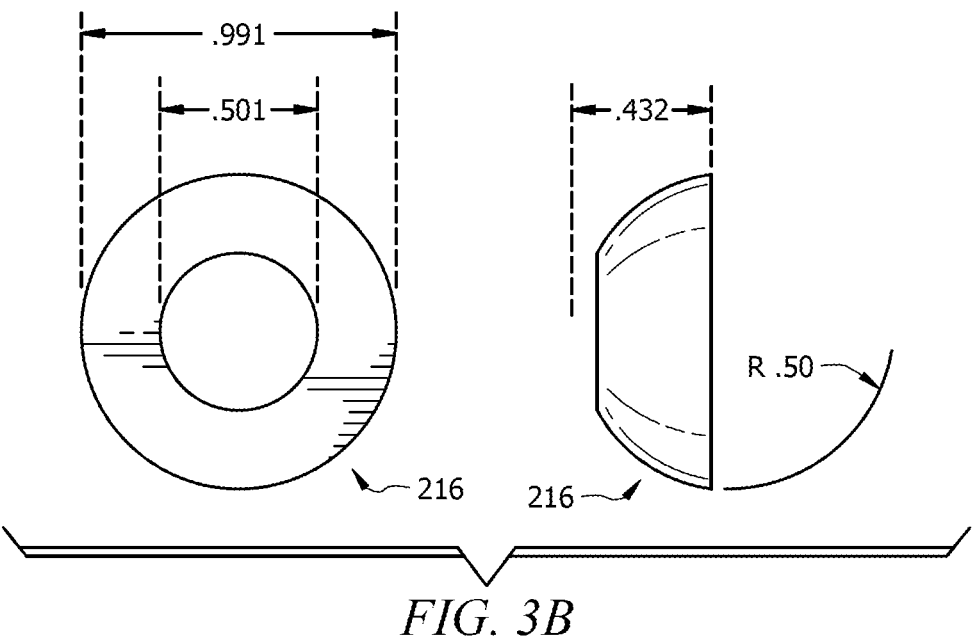

FIG. 3b shows different views of the bowl portion 216 of the second knob 204 configured with threads to couple to a recess portion of a bushing element 206 of apparatus 200. In an embodiment, the second knob 204 and the bowl portion 216 may rotate about bushing element 206 as an assembly to create a clamping surface for the threaded shaft 404 coupled to the workpiece 102. In an embodiment, the bushing element 206 may rotate about the bowl portion 216 allowing the nature of vector bushing apparatus 110/200 to keep the system 110/200 rigid and allowing vector apparatus 110 (200) alignment.

Figure 3C:
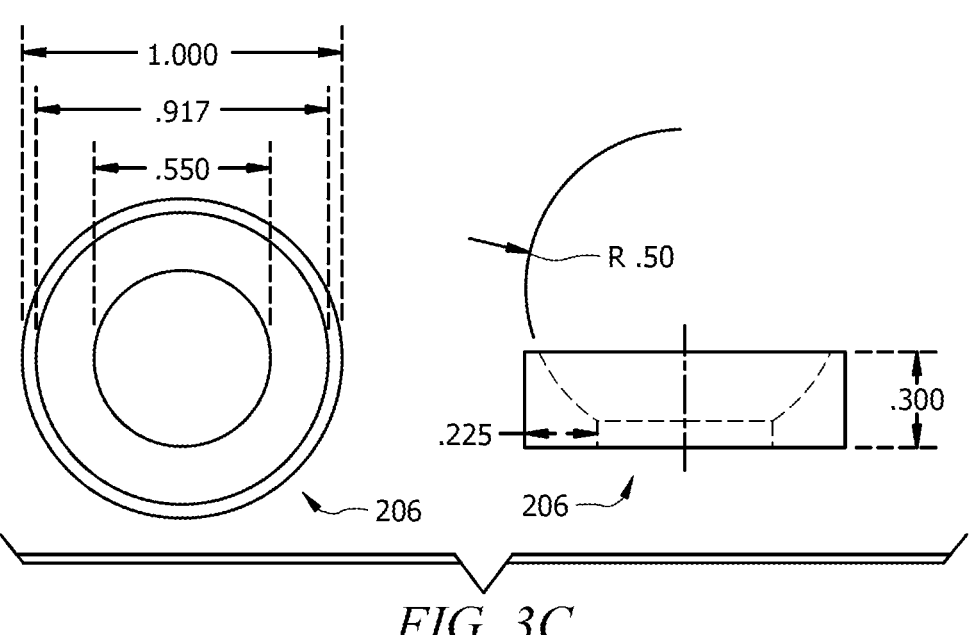

FIG. 3c shows different views of the recess portion in bushing element 206 with threaded tracks to allow the second knob 204 to be placed. In an embodiment, the bowl portion 216 of the second knob 204 sits on the recess of the bushing element 206 forming the seating portion.

Figure 3D:
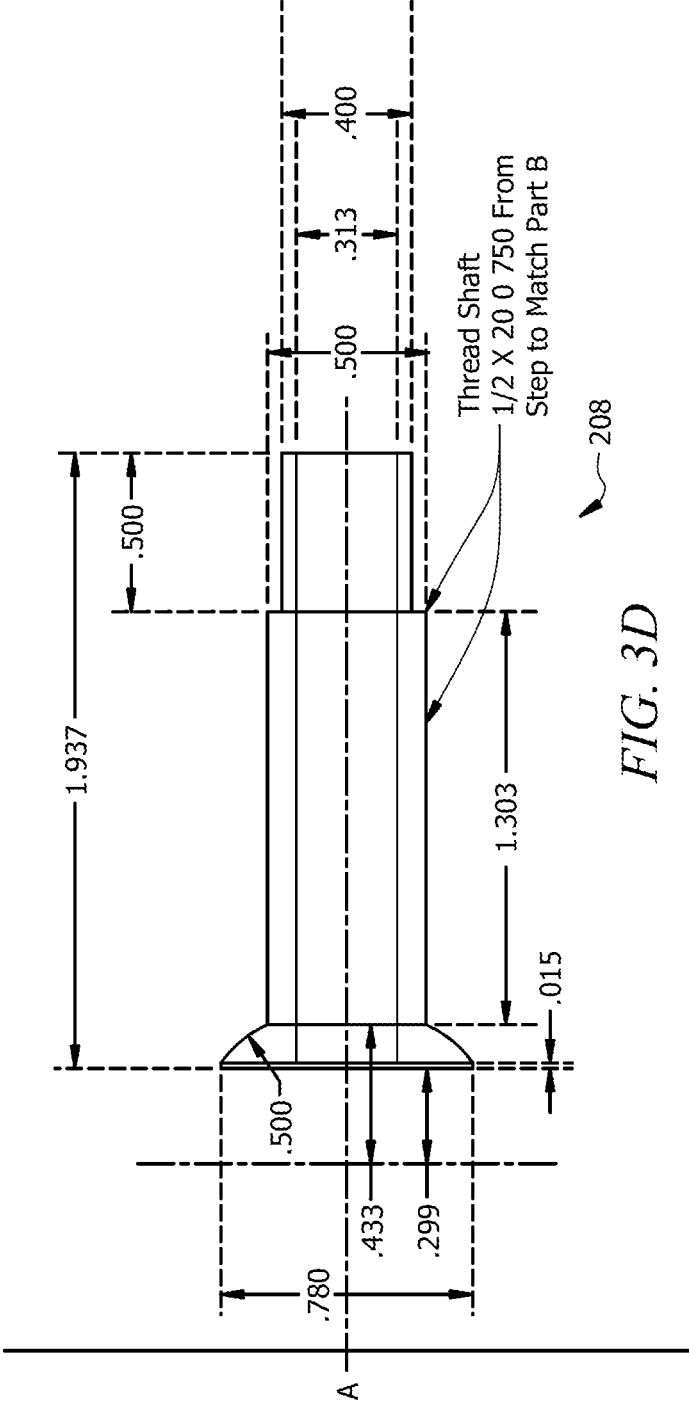

FIG. 3d illustrates views of the pivoting portion 208 of the universal bushing apparatus, according to certain embodiments. The pivoting portion 208 may match with the threads of the second knob 204 that includes the knurled surfaces.

Figure 4A:
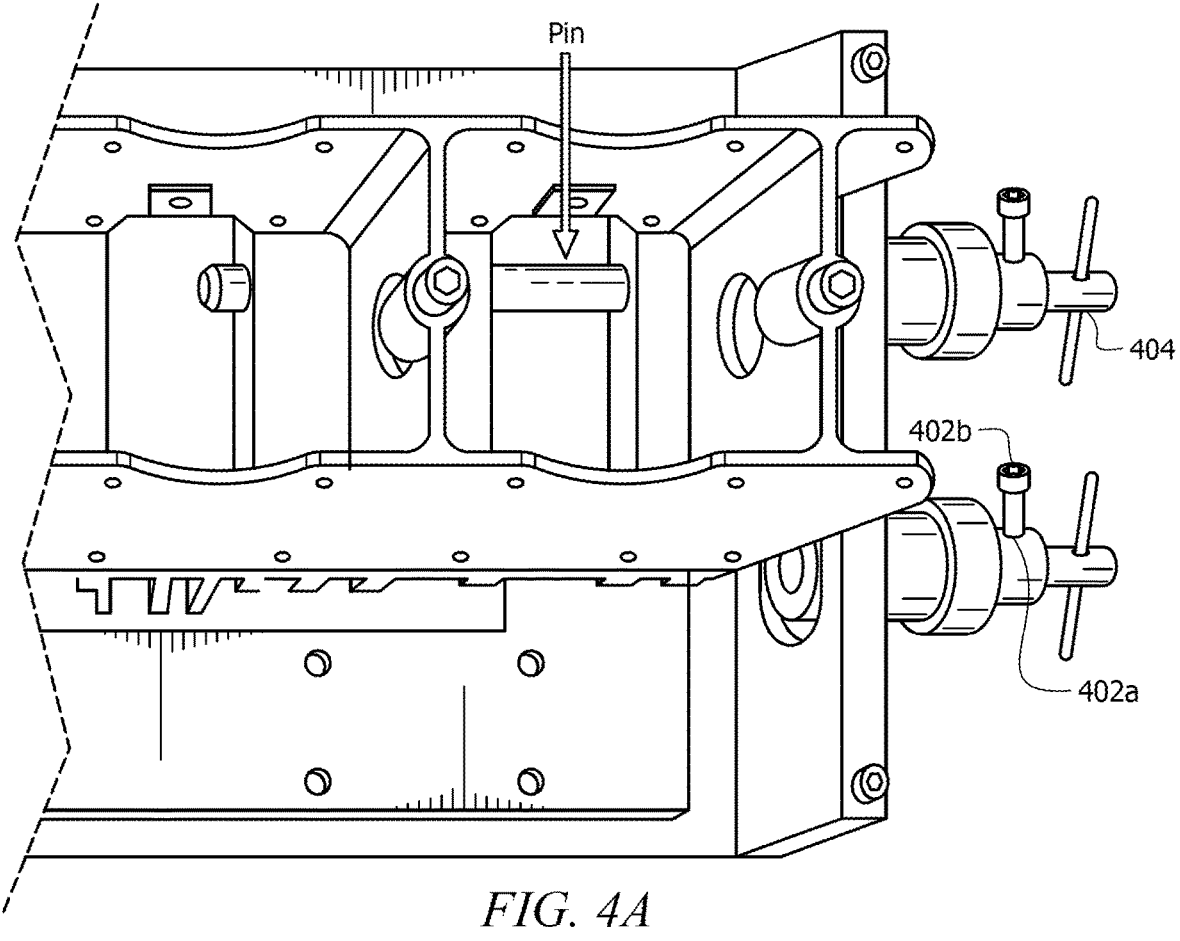
FIGS. 4a-4b illustrate universal vector bushing apparatuses coupled to vertical plates of the bushing system, according to certain embodiments.
Figure 4B:
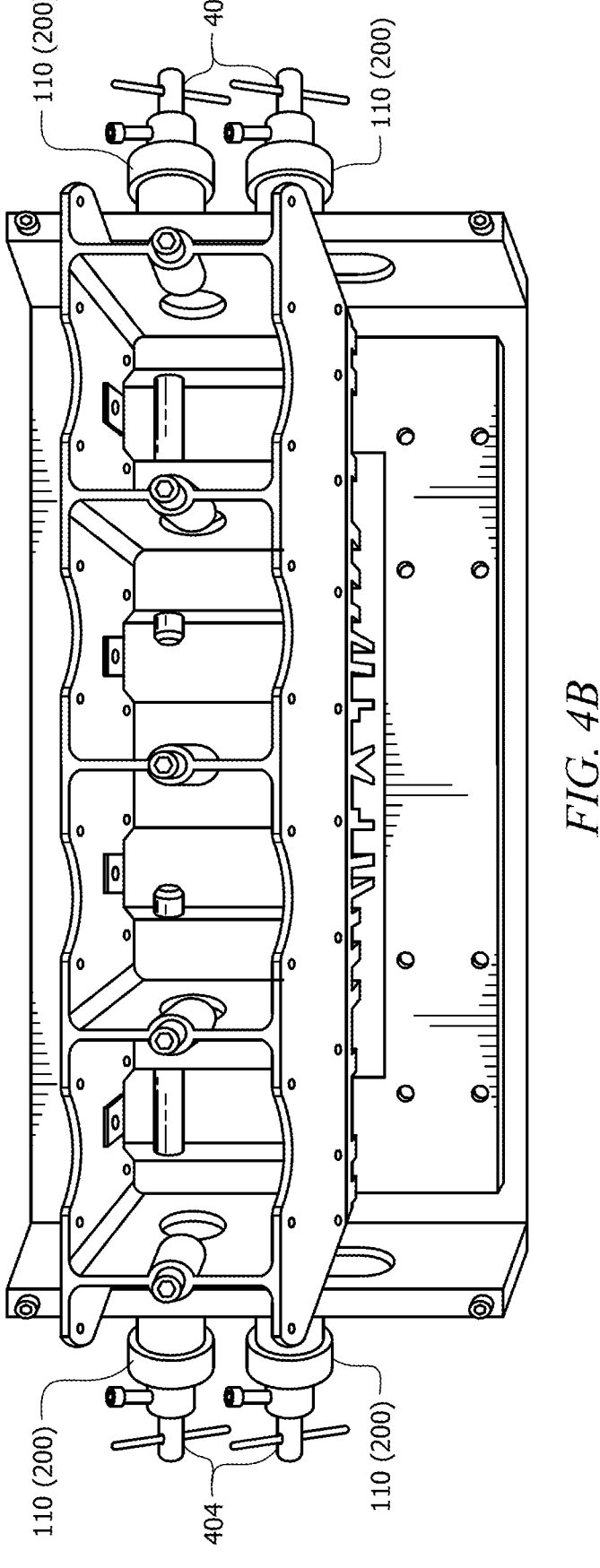

FIGS. 4a-4b show a tie bar as the workpiece (102). FIGS. 4a-4b show four universal vector bushing apparatuses 110 (200) coupled to the vertical securing the workpiece 102. Referring to FIG. 4a, the first knob 202 may include a fastener opening 402a to receive a fastening rod 402b. In an embodiment, the first knob 202 may include one or more fastener openings to receive one or more fastening rods. In some embodiments, the fastening rod 402b may be made of alloy steel, plastic, aluminum, or any other material capable of providing tightening surface to the threaded shafts 404. For example, The fastening rod 402b may enable tightening threaded shafts 404 ("PIN" labeled in FIG. 4*a*) inserted through a hollow portion of the first knob 202 along a slotted path as shown in FIG. 4*a* and FIG. 4*b*. In an embodiment, the threaded shaft 404 may be slid into one or more holes 102*a* of the workpiece 102 as shown in FIG. 4*a* and FIG. 4*b*. The threaded shaft 404 may be made of steel, aluminum, or any metal. The threaded shaft 404 may be configured to be elongated pin kind structure with its end slid into the holes 102*a* as any of pointed structures. The pointed structure may include, but are not limited to, flat point, domed point, cone point, cup point, extended point, pilot point, dog point and knurled cup point. In an embodiment, separate threaded shafts 404 may be utilized for different vector bushing apparatus 110. In some embodiments, single threaded shaft 404 may be used between a pair of vector bushing apparatus 110. The slotted path may be formed by the first knob 202, the second knob 204, the bushing element 206, and the pivoting portion 208. This way of inserting the threaded shafts 404 via the slotted path into the holes 102*a* of the workpiece 102 securely holds the workpiece 102 that may help achieving enhanced debur operations.

Figure 5:
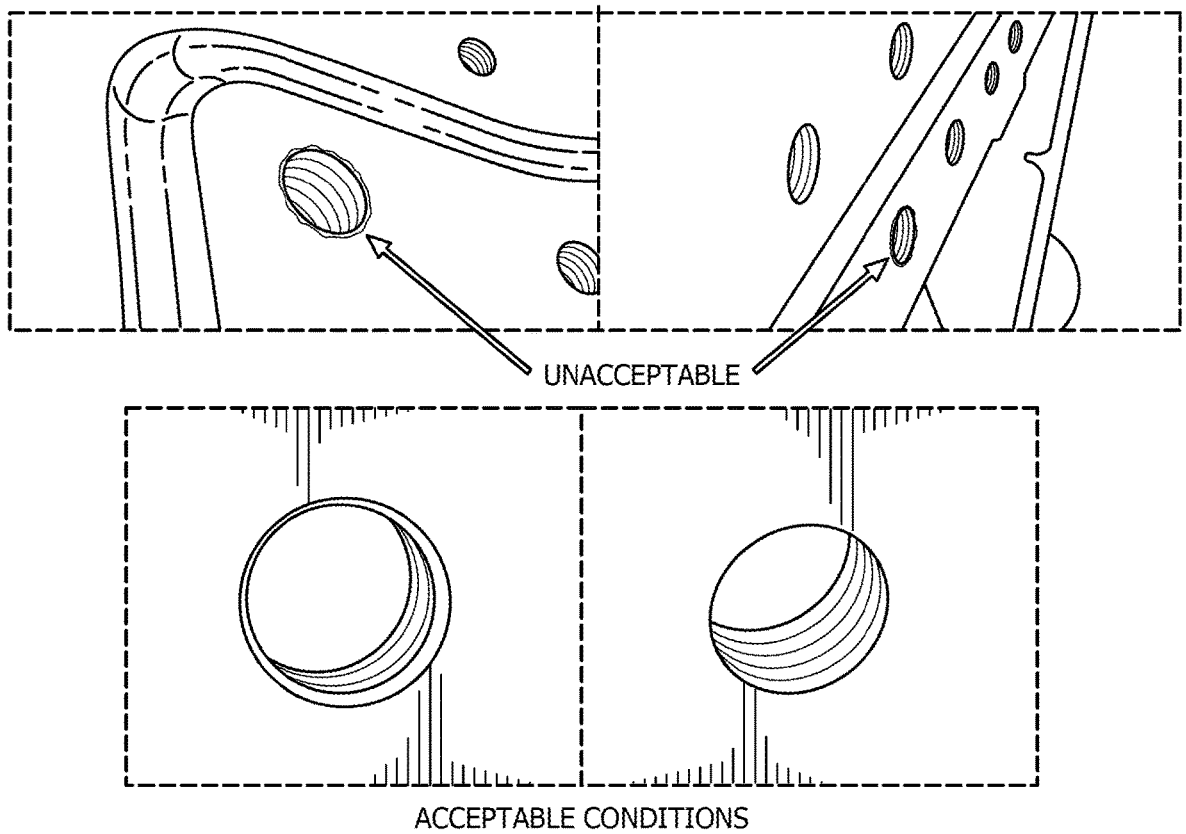
FIG. 5 illustrates deburring results before and after employing the universal bushing system and universal bushing apparatuses, according to certain embodiments.

FIG. 5 shows different acceptable and unacceptable deburs. Existing deburring leaves raised material. By utilizing universal vector bushing system 100 and universal vector bushing apparatuses 110 (200), the deburs may be smooth surfaces without raised material. In an embodiment, the universal vector bushing system 100 and universal vector bushing apparatuses 110 (200) may enable any kind of deburring, for example, inner mold line (IML) debur using IML cutter and debur, and outer mold line (OML) debur using OML cutter and debur.

Figure 6:
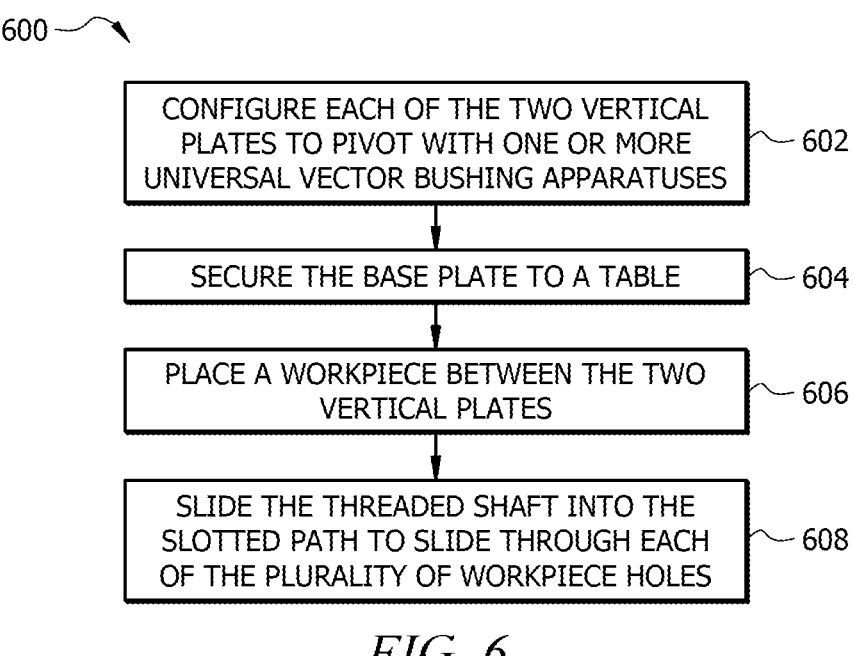
FIG. 6 illustrates a flowchart for using a universal bushing system and apparatus, according to certain embodiments.

FIG. 6 illustrates a flowchart for using a universal vector bushing system 100 and apparatus 200 (110), according to certain embodiments. The method begins at step 602 for configuring each of the two vertical plates 108 to pivotally couple to one or more universal vector bushing apparatuses 110 as shown in FIG. 1*b*. In an embodiment, each of the two vertical plates 108 may be mounted to the base plate 104. The two vertical plates 108 may be separated by a predetermined distance on the base plate 104 according to the one or more slots 106 of the base plate 104. In some embodiments, the method includes fitting the one or more plate fasteners 112 of each vertical plate 108 to fit into one or more slots 106 of the base plate 104. Each of the one or more slots 106 allows the vertical plates 108 to be adjustable at length and width dimensions of the workpiece 102. The two vertical plates 108 separated by the predetermined distance positions the workpiece 102. The predetermined distance between the two vertical plates 108 may depend on the kind of workpiece 102 that needs fixing and deburring. For example, the workpiece 102 may be a tie bar.

In an embodiment, each universal vector bushing apparatus 110 (200 in FIG. 2) may include the first knob 202, the second knob 204, the bushing element 206, and the pivoting portion 208. The first knob 202 includes the plurality of threaded structures and knurled surfaces as shown in FIG. 3*a*. The second knob 204 may be coupled to the first knob 202 via the threaded structures. The second knob 204 may include threads to match part pivoting portion 208 and may include knurled surfaces as shown in FIG. 3*a*. The second knob 204 further comprises the bowl portion 216. The bowl portion 216 includes threads that may be used to be coupled to the recess of the bushing element 206. The bushing element 206 may include the recess with threaded tracks to allow the second knob 204 to be placed. The pivoting portion 208 includes the first end 210 which may be coupled to the bushing element 206 and the second end 212 which may be pivotally connected to the vertical plate 108 of the plurality of vertical plates 108. In an embodiment, each of the first knob 202, the second knob 204, the bushing element 206, and the pivoting portion 208 forms the hollow portion 214 concentric at the longitudinal axis that forms the slotted path to receive a threaded shaft 404.

At step 603, the base plate 104 may be secured to a table or a bench. For example, C-clamps may be used as fasteners to secure the base plate 104 to the table or bench. In some embodiments, any securing tool may be used to lock the base plate 104 on the table/bench.

At step 606, the workpiece 102 or tie bar may be positioned between the two vertical plates 108. The workpiece 102 or tie bar as shown in FIG. 1*a* and FIG. 1*b* includes multiple holes 102*a*.

At step 608, the threaded shaft 404 may be slid into the slotted path to slide through each of the multiple workpiece holes 102*a*. With the sliding of the threaded shaft 404, the workpiece 102 (tie bar) may be secured in the universal vector bushing system 100. The workpiece 102 may be secured and locked by tightening the second knob 204 while the first knob 202 may be kept sturdy.

After the workpiece 102, for example, the tie bar is secured and locked, a worker may begin or perform deburring the workpiece 102. The locking of the workpiece 102 intact and tightly on the universal bushing system using universal vector bushing apparatuses 110, the holes that are deburred may result without having any raised material as shown in FIG. 5.

Figure 7:
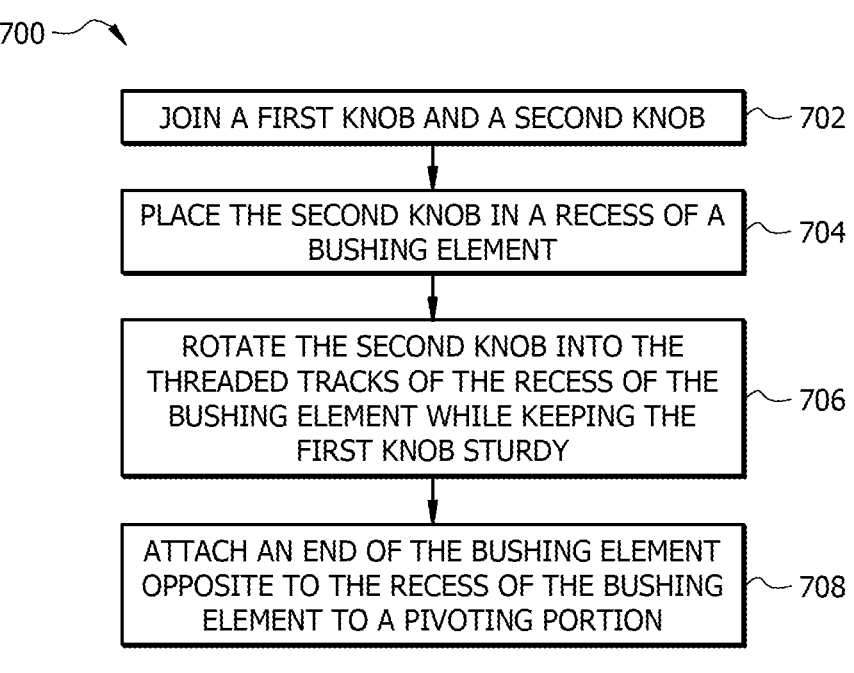
FIG. 7 illustrates a flowchart for assembling various components and parts to form a universal bushing apparatus and system, according to certain embodiments.

FIG. 7 illustrates a flowchart for assembling various components and parts to form the universal bushing apparatus 200 and system, according to certain embodiments. The process 700 begins at step 702 joining the first knob 202 and the second knob 204. In an embodiment, the second knob 204 may be joined to the first knob via the plurality threaded structures of the first knob 202. In an embodiment, the first knob 202 may include set screws 302 and holes (not shown) to operate the set screws 302 to apply pressure onto the pivoting portion 208 and lock the movement of the pivoting portion 208 forming a clamping surface for the threaded shaft 404.

At step 704, the second knob 204 may be placed in the recess of the bushing element 306. In an embodiment, the recess of the bushing element 206 may include the threaded tracks to allow the second knob 204 to be placed in the recess. In an embodiment, the second knob 204 may include the bowl portion 216 that may be configured with threads to couple or rotate into the recess portion of the bushing element 206 of apparatus 200.

At step 706, the second knob 204 including the bowl portion 216 may be rotated into the threaded tracks of the recess of the bushing element 206 while keeping the first knob 202 sturdy.

At step 708, the method includes attaching an end of the bushing element 206 opposite to the recess of the bushing element 206 to the first end 210 of the pivoting portion 208. In an embodiment, the method further includes placing the vector plates 211 between the end of the bushing element 206 and the first end 210 of the pivoting portion 208. The method further includes securing the first end 210 of the pivoting portion 208 into the vector plates 211 to restrict movement of the bushing element 206 while the second knob 204 is tightened. In an embodiment, the method further includes pivotally connecting the second end 212 of the pivoting portion 208 to the vertical plate 108 that may be mounted on the base plate 104. In an embodiment, the pivoting portion 208 may be configured to prevent rotation of the bushing element 206 while the second knob 204 is tightened and the first knob 202 may be held sturdy.

In an embodiment, each of the first knob 202, the second knob 204, the bushing element 206, and the pivoting portion 208 may be positioned in an alignment to form the slotted path along a longitudinal axis to receive the threaded shaft 404. In an embodiment, the method further includes sliding the threaded shaft 404 into the slotted path to slide through each of a plurality of workpiece holes 102*a*. The workpiece 102 may be secured by tightening the second knob 204 while holding the first knob 202 sturdy.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A universal bushing system, comprising:
  a base plate;
    a plurality of vertical plates mounted to the base plate, wherein the plurality of vertical plates are separated by a predetermined distance on the base plate to position a workpiece; and
    one or more universal vector bushing apparatuses coupled to the plurality of vertical plates, each universal vector bushing apparatus comprising:
      a first knob comprising a plurality of threaded structures;
      a second knob coupled to the first knob via the threaded structures;
      a bushing element comprising a recess with threaded tracks to allow the second knob to be placed; and
      a pivoting portion having a first end coupled to the bushing element and a second end to pivotally connect to a vertical plate of the plurality of vertical plates;
      wherein each of the first knob, the second knob, the bushing element, and the pivoting portion comprises a hollow portion concentric at a longitudinal axis that forms a slotted path to receive a threaded shaft.

2. The system of claim 1, wherein the base plate is further configured with a plurality of slots formed at predetermined locations, and each slot is configured to receive a plate fastener.

3. The system of claim 2, wherein each vertical plate of the plurality of vertical plates comprises one or more plate fasteners to fit into one or more slots of the plurality of slots of the base plate, wherein each of the one or more slots allows the plurality of vertical plates to be adjustable at length and width dimensions of the workpiece.

4. The system of claim 3, wherein each vertical plate of the plurality of vertical plates comprises an opening to couple to the one or more universal vector bushing apparatuses.

5. The system of claim 1, wherein the hollow portion is any of a spherical shape and a circular shape matches a shape of the threaded shaft.

6. The system of claim 1, wherein the first knob further comprises a fastener opening to receive a fastening rod.

7. The system of claim 1, wherein the second knob further comprises a bowl portion, the bowl portion comprising threads to couple to the recess of the bushing element.

8. A universal bushing apparatus, comprising:
  a first knob comprising a plurality of threaded structures;
  a second knob coupled to the first knob via the threaded structures;
  a bushing element comprising a recess with threaded tracks to allow the second knob to be placed; and
  a pivoting portion having a first end coupled to the bushing element and a second end to pivotally connect to a vertical plate of the plurality of vertical plates;
  wherein each of the first knob, the second knob, the bushing element, and the pivoting portion comprises a hollow portion concentric at a longitudinal axis that forms a slotted path to receive a threaded shaft.

9. The apparatus of claim 8, wherein each of the plurality of vertical plates comprises an opening to couple to the universal bushing apparatus.

10. The apparatus of claim 8, wherein the hollow portion is any of a spherical shape and a circular shape matches a shape of the threaded shaft.

11. The apparatus of claim 8, wherein the first knob further comprises a fastener opening to receive a fastening rod.

12. The apparatus of claim 8, wherein the second knob further comprises a bowl portion, the bowl portion comprising threads to couple to the recess of the bushing element.

13. The apparatus of claim 8, wherein each of the plurality of vertical plates is mounted to a base plate, and the plurality of vertical plates are separated by a predetermined distance on the base plate to position a workpiece.

14. The apparatus of claim 13, wherein the base plate is further configured with a plurality of slots formed at predetermined locations, and each slot is configured to receive a plate fastener.

15. The apparatus of claim 14, wherein each slot allows the plurality of vertical plates to be adjustable at length and width dimensions of the workpiece.

16. A method of using a universal bushing system, the method comprising:
  configuring each of two vertical plates to pivotally couple to one or more universal vector bushing apparatuses, wherein each of two vertical plates is mounted to a base plate, and the two vertical plates are separated by a predetermined distance on the base plate to position a workpiece;

positioning the workpiece between the two vertical plates, wherein the workpiece comprises plurality of workpiece holes; and sliding a threaded shaft into a slotted path to slide through each of the plurality of workpiece holes, wherein the workpiece is secured by tightening a second knob of the one or more universal vector bushing apparatuses while keeping a first knob sturdy.

17. The method of claim 16, further comprising using fasteners for securing the base plate to a table.

18. The method of claim 16, further comprising deburring the workpiece after the workpiece is secured.

19. The method of claim 16, further comprising fitting one or more plate fasteners of each vertical plate into one or more slots of the base plate, wherein each of the one or more slots allows the two vertical plates to be adjustable at length and width dimensions of the workpiece.

20. The method of claim 16, wherein the second knob further comprises a bowl portion, the bowl portion comprising threads to be coupled to a recess of a bushing element of one or more universal vector bushing apparatuses.

* * * * *